United States Patent
Workman et al.

(10) Patent No.: US 7,659,509 B2
(45) Date of Patent: Feb. 9, 2010

(54) SYSTEM FOR SCANNING PROBE MICROSCOPE INPUT DEVICE

(75) Inventors: Richard K. Workman, Sunnyvale, CA (US); David Patrick Fromm, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 472 days.

(21) Appl. No.: 11/555,220

(22) Filed: Oct. 31, 2006

(65) Prior Publication Data

US 2008/0142708 A1 Jun. 19, 2008

(51) Int. Cl.
*G01N 23/00* (2006.01)
*G21K 7/00* (2006.01)
*H01J 3/14* (2006.01)

(52) U.S. Cl. ............. 250/310; 250/306; 250/307; 850/1; 850/2; 850/3; 33/503; 33/504; 73/105

(58) Field of Classification Search ............ 250/306, 250/307, 310; 850/1–4, 9, 10, 63; 73/104, 73/105; 33/503–505
See application file for complete search history.

(56) References Cited

U.S. PATENT DOCUMENTS

| | | | | |
|---|---|---|---|---|
| 5,376,790 A * | 12/1994 | Linker et al. | | 850/2 |
| 5,496,999 A * | 3/1996 | Linker et al. | | 850/2 |
| 5,753,911 A * | 5/1998 | Yasuda et al. | | 850/1 |
| 5,877,891 A * | 3/1999 | Park et al. | | 359/372 |
| 5,939,719 A * | 8/1999 | Park et al. | | 850/1 |
| 5,948,972 A * | 9/1999 | Samsavar et al. | | 73/105 |
| 5,965,881 A * | 10/1999 | Morimoto et al. | | 250/234 |
| 6,144,028 A * | 11/2000 | Kley | | 250/234 |
| 6,220,099 B1 * | 4/2001 | Marti et al. | | 73/633 |
| 6,229,138 B1 * | 5/2001 | Kley | | 250/234 |
| 6,232,597 B1 * | 5/2001 | Kley | | 250/234 |
| 6,242,734 B1 * | 6/2001 | Kley | | 250/234 |
| 6,246,054 B1 * | 6/2001 | Toda et al. | | 850/1 |
| 6,281,491 B1 * | 8/2001 | Kley | | 250/234 |
| 6,339,217 B1 * | 1/2002 | Kley | | 250/216 |
| 6,441,371 B1 * | 8/2002 | Ahn et al. | | 850/1 |
| 6,515,277 B1 * | 2/2003 | Kley | | 250/234 |
| 6,559,931 B2 * | 5/2003 | Kawamura et al. | | 356/4.01 |
| 6,960,765 B2 * | 11/2005 | Tomimatsu et al. | | 850/1 |
| 7,392,692 B2 * | 7/2008 | Noda | | 73/105 |
| 2002/0135755 A1 * | 9/2002 | Kley | | 356/72 |
| 2003/0048438 A1 * | 3/2003 | Kawamura et al. | | 356/141.1 |
| 2005/0269495 A1 * | 12/2005 | Kakemizu | | 250/234 |
| 2006/0113469 A1 * | 6/2006 | Baba et al. | | 250/310 |
| 2007/0194225 A1 * | 8/2007 | Zorn | | 250/306 |
| 2008/0142708 A1 * | 6/2008 | Workman et al. | | 250/306 |
| 2008/0151256 A1 * | 6/2008 | Kikawa et al. | | 356/496 |
| 2008/0257023 A1 * | 10/2008 | Jordil et al. | | 73/105 |
| 2009/0024020 A1 * | 1/2009 | Swaminathan et al. | | 600/410 |
| 2009/0062935 A1 * | 3/2009 | Abramovitch et al. | | 700/42 |

* cited by examiner

*Primary Examiner*—Bernard E Souw

(57) ABSTRACT

In accordance with the invention, a computer pointing device is interfaced with an SPM system to provide real time control of the SPM and improve the ease of use.

19 Claims, 4 Drawing Sheets

SYSTEM FOR SCANNING PROBE MICROSCOPE INPUT DEVICE

BACKGROUND

Typical scanning probe microscopes (SPM) are difficult to use and are not typically user friendly. One reason for this is the typical non-intuitive interface between the user and the scanning probe tip that interacts with the sample surface. An SPM typically functions by moving a scanning probe tip relative to the sample surface and varying forces, currents or voltages between the scanning probe tip and the materials of the sample surface are recorded. Typical commercial SPMs are controlled by a WIMP (window, icon, menu, pointing device) interface that requires the user to enter numerical data into input fields, click toggle boxes or move input sliders to operate the SPM. Using a WIMP interface, the input parameters are typically tedious to optimize at normal SPM scanning speeds on the order of a minute. For high SPM scanning speeds on the order of seconds or less, the performance of operations such as pan and zoom by entering numerical data into input fields is slow compared to the SPM scanning speed and leads to a loss of accuracy and functionality. In some SPM applications, users wish to use the scanning probe tip as a nano-scale tool for experiments such as an application of a localized nano-scale force, local temperature probing, application of selective electrical fields, measuring capacitance or the manipulation of nano-scale objects which is difficult using the typical input interface.

SUMMARY

In accordance with the invention, a computer pointing device is interfaced with an SPM system to provide real time control of the SPM and improve the ease of use.

DETAILED DESCRIPTION

Figure 1:
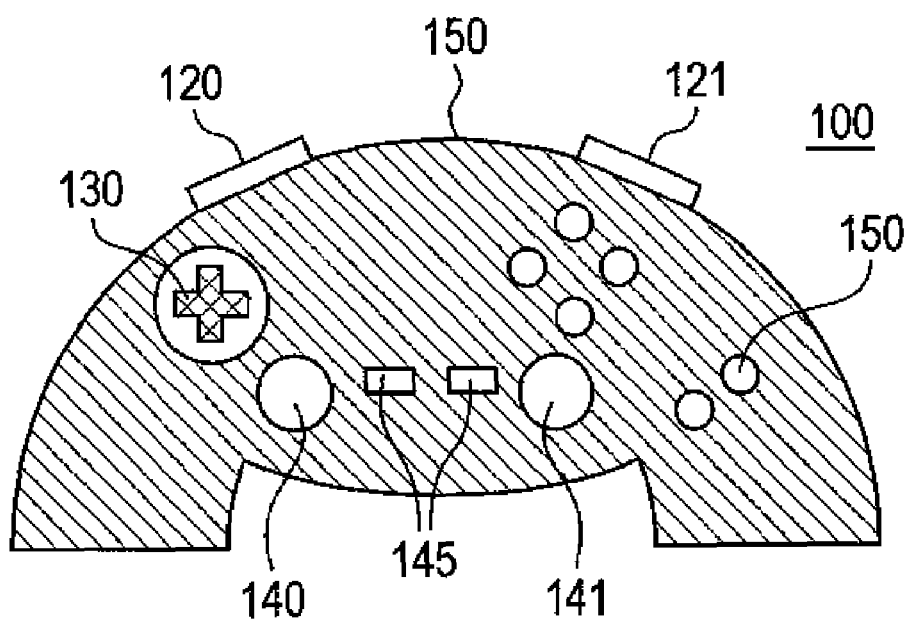
FIG. 1 shows a pointing device in accordance with the invention.

WIMP interfaces are typically used for controlling modern measurement systems. In these systems, a user inputs a series of control parameters into a controller or computer using a WIMP interface. These series of control parameters are converted into subsequent operations of the measurement systems. SPMs typically function in this mode, with the user setting numerous control parameters relevant to instrument scanning. The SPM user can monitor the instrument scan and slowly alter control parameters which can make operation difficult for some SPM operations. In contrast to WIMP interfaces, some systems are controlled by an active control interface, where movement of part of or of the entire interface device is translated into movement of system components. For example, the driver of a vehicle uses a steering wheel to guide the vehicle down the road. This is in contrast to a WIMP interface where a driver would, for example, need to repeatedly enter steering angle data into a box or mouse click on icons to change the steering angle. Operating an SPM is typically a highly interactive operation. In accordance with the invention, an improved user interface employing modern computer pointing devices, such as a gaming-type controller or a mouse, to provide active input control, analogous to "fly-by-wire" systems used in some newer cars and aircraft. This interface allows the user fast and direct control of SPM parts in combination with the possibility of tactile feedback from the SPM operation. The interface also serves to reduce the training time needed to become proficient in SPM operation because of it's more intuitive nature.

The active-control interface allows operation of common SPM commands, an intuitive way to enable complex movement operations, and to easily understand tip-sample forces by "feel." Following the example above, much of a steering wheel's effectiveness is derived from both the tactile and visual feedback that the driver receives while driving. Much of the steering wheel's effectiveness is derived from the tactile and visual feedback that the driver receives while driving. As an example, a driver can feel a car slipping on a patch of ice through the steering wheel response and make control adjustments necessary to keep the vehicle on the road. Whereas a WIMP interface or other traditional measurement system interface enables SPM operation, an active-control input interface enables the SPM user to, in essence, "pilot" the microscope, a capability that is useful in both real-time and in off-line data analysis.

In this description, the real-time operation of the SPM is referred to as the control and movement of a scanning probe tip with respect to the sample surface. The control and movement of the scanning probe tip can occur by moving the scanning probe tip in the x-, y-, and z-axes with respect to a fixed sample stage, moving the sample stage in the x-, y-, and z-axes with respect to a fixed scanning probe tip, or moving a combination of the sample stage and tip. For example, the scanning probe tip may be moved in the z-axis and the sample stage in the x-y plane.

FIG. 1 shows an exemplary embodiment in accordance with the invention. The input interface of FIG. 1 is a typical computer pointing device that in accordance with the invention acts as an interface to perform "fly by wire" type functions in controlling an SPM. The term "pointing device" is to be understood to include, but is not limited to, game pads such as those found on the SONY PLAYSTATION 2 or MICROSOFT XBOX, joystick controllers, a computer mouse, isometric joystick, computer touch-screens, scroll-wheels such as found on APPLE IPOD devices, wearable pointing devices such as gloves and a touchpad.

Figure 2A:
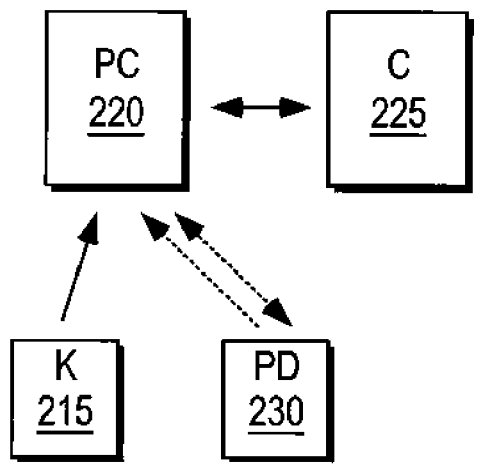
FIGS. 2a-b show embodiments in accordance with the invention.
Figure 2B:
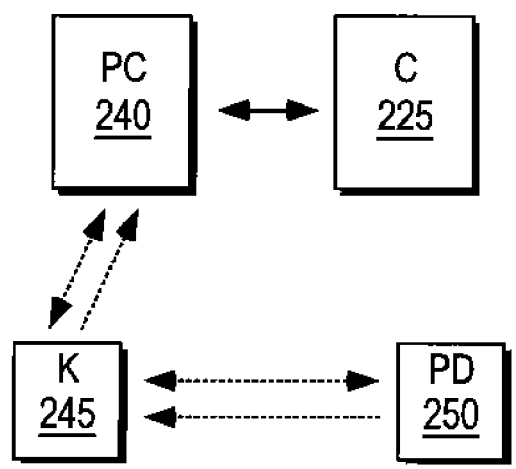

The pointing device may be enabled to interface with the SPM in two ways. In embodiments in accordance with the invention shown in FIGS. 2a-b, SPM controller 225 communicates with personal computer or CPU 220 using a traditional personal computer interface port, such as, for example, a USB port, a Firewire port, a serial port, a parallel port or a proprietary interface. FIG. 2a shows keyboard 215 functioning as a textual input device to personal computer 220 which interfaces to SPM controller 225. In FIGS. 2a-b and 3a-b communication direction is indicated by the arrow direction, with double headed arrows indicating bidirectional communication and single headed arrows indicating unidirectional communication. Dashed arrows in FIGS. 2a-b and 3a-b indicate that embodiments in accordance with the invention may be embodied using either unidirectional or bidirectional communication. As shown in FIG. 2a, pointing device 230, is in communication with personal computer 220 to enable an active control interface. FIG. 2b shows an embodiment in accordance with the invention where pointing device 250 is in communication with keyboard 245 which in turn is in communication with personal computer 240. The software interface between pointing devices 230, 250 and personal computers 220, 240, respectively, is provided by device driver software which allows for easy switching between different pointing devices. Note that in both FIGS. 2a and 2b, there is communication between personal computer 220 and SPM controller 225 and personal computer 240 and SPM controller 225.

Figure 3A:
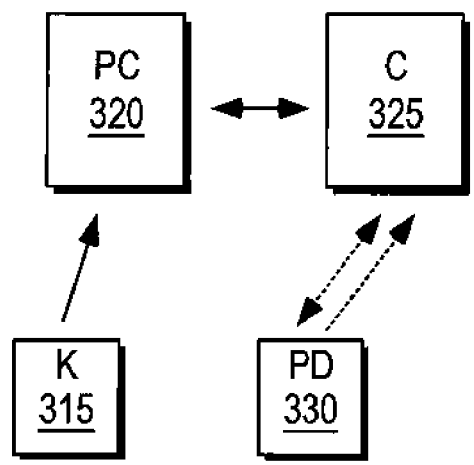
FIGS. 3a-3b show embodiments in accordance with the invention.
Figure 3B:
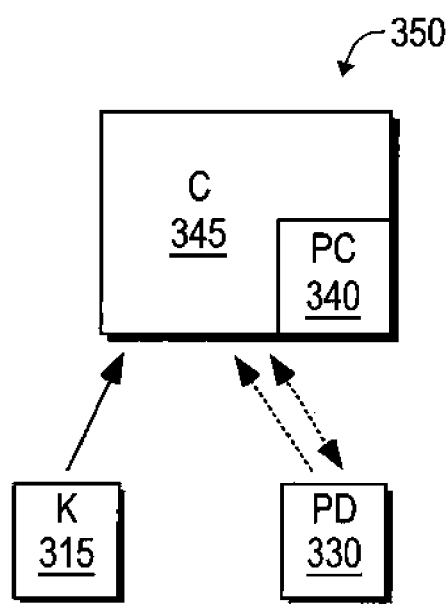

FIGS. 3a-b show embodiments in accordance with the invention. In both FIGS. 3a and 3b pointing device 330 is in direct communication with SPM controller 325 or SPM controller functional portion 345. Direct connectivity avoids reliance on the computer BUS to transfer pointing device data between personal computer 320 or 340 and SPM controller 325 or integrated SPM controller/personal computer 350, respectively. This typically provides an advantage in high-speed operations, especially as the number of input/output channels increases. FIG. 3a shows an embodiment with direct communication between pointing device 330 and SPM controller 325 which may be provided by a specialized controller connection port or other wired or wireless interface to SPM controller 325. FIG. 3b shows an embodiment where integrated SPM controller/personal computer 350 integrates personal computer or general CPU functionality within the controller. Hence, personal computer functional portion 340 of integrated SPM controller/personal computer 350 allows traditional personal computer connectivity and driver software to be used to directly couple pointing device 330 to SPM controller functional portion 345 of integrated SPM controller/personal computer 350. For the embodiments shown in FIGS. 2a-b and FIGS. 3a-b, pointing devices 230, 250 and 330 may be wired or wireless with respect to their connectivity.

Figure 4A:
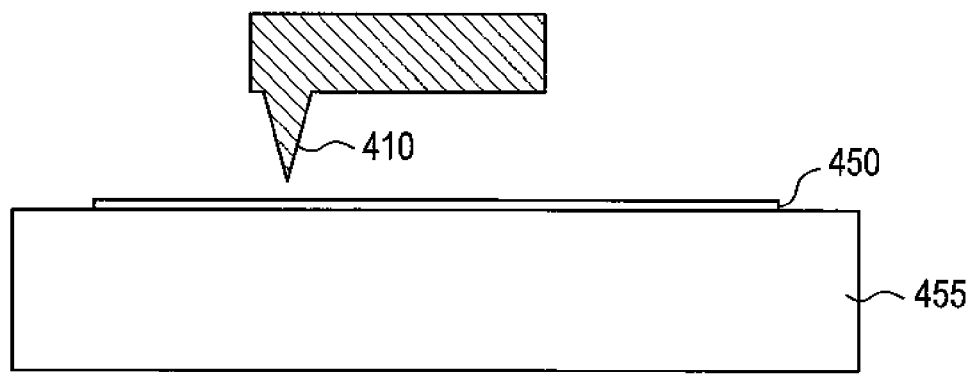
FIG. 4a shows a typical scanning probe proximate to a sample surface.

In accordance with the invention, pointing device 100 in FIG. 1 is analogous to a joystick on "fly by wire" aircraft. Pointing device 100 allows the user simultaneous input control of SPM control parameters and tactile parametric feedback. FIG. 1 shows input controls available to the user on typical pointing device 100. Controls available include thumb joysticks 140, 141, control pad 130, start/select controls 145, trigger controls 120, 121 and action controls 150. Many aspects of SPM operation may be performed with pointing device 100. For example, operations such as pan and zoom can be performed using control pad 130 or using a combination of thumb joysticks 140, directly translating sample surface 450 relative to scanning probe tip 410. This can be achieved by either moving scanning probe tip 410 relative to sample surface 450 or by moving sample stage 455 relative to scanning probe tip 410 (see FIG. 4a). Action controls 150 may be used, for example, to start macros or scripts, or pre-defined personal computer or controller functions may be programmed to execute user defined functions or to modify the behavior of thumb joysticks 140, 141 or other controls. Buttons, such as trigger controls 120, 121, allow a function to be performed for as long as the button is depressed, while still allowing other controls to be used, such as thumb joysticks 140, 141. An example of such use is the application of an electric field while moving scanning probe tip 410 with respect to sample surface 450 (e.g., see FIG. 4a). The user applies a negative bias voltage by activating trigger control 120 and applies a positive bias voltage by activating trigger control 121. During this time, other input controls are available for use, such as movement of scanning probe tip 410 with respect to sample surface 450 (e.g., see FIG. 4a) and the pan and zoom function using thumb joysticks 140 and 141, for example.

Macros would typically be provided by the SPM manufacturer and readily modified by the user in analogy to the programming of control buttons for typical video game systems. Color coding of action controls 150 makes it easier for users to recognize the different functionalities associated with action controls 150. The placement of action controls 150 on pointing device 100 relative to the user's hand makes them useful for performing online operations such as altering the scanning probe tip's applied force "setpoint" or other operations such as, for example, increasing or decreasing gains, increasing or decreasing the scan speed of the SPM or saving an image or movie of the SPM scan. Start/select controls 145 are typically located relatively out of the way from the other controls on pointing device 100 which makes them useful for performing operations that need to be done at the beginning or the end of an SPM scan, such as, for example, the approach or retraction of the scanning probe tip from sample surface 450 (see.

In an embodiment in accordance with the invention, pointing device 100 may be used with a high speed SPM system where the image frame rate is on the order of one frame per second or more, approaching what the user perceives as real time motion. SPM systems require the user to monitor and modify several operating parameters to obtain accurate scan images. High speed SPM operation requires direct control of multiple parameters in real-time, analogous to modern video games where a player has to respond to changing conditions in real time. The demonstrated ease of use of typical pointing devices such as pointing device 100 as a user interface for video game systems similarly improves the usability of the high speed SPM system.

Because many commands can be made easy to perform, the user may use pointing device 100 to input a series of repetitive commands to program the SPM for performing operations as frequently as pixel-by-pixel. For example, the user may program the SPM to step a single pixel, retract and approach the scanning probe tip to the sample surface to obtain a force versus distance curve. Other examples include applying voltage steps in any wave-form specified by the user. These waveforms may be selected from a list of common inputs, such as a linear ramp, top hat sinusoidal-input or saw-tooth wave. Alternatively, the user may pre-program a specific series of discrete voltage pulses or a combination of pre-programmed voltage wave packets, calling for their application to sample surface 450 with the exercise of a single button. Pointing devices such as pointing device 100 allow the input of several commands at essentially the same time and the ability to easily carry out sequence commands.

As the SPM field has grown, users have started to apply the SPM as a nano-scale tool to perform operations beyond sample surface imaging. For example, manipulation of nano-scale objects is possible by pushing the nanoscale objects over sample surface 450 using scanning probe tip 410 or the performance of indentation experiments is used to investigate the properties of thin films. Another class of nano-scale experiments involve slowly pulling on objects that are anchored to sample surface 450 while monitoring the force as a function of time or the tip-sample surface separation distance (see FIG. 4b). Possible other nano-manipulation techniques involve using a modulated chemical force to pick up and put down an object on sample surface 450. A modulated chemical force involves applying optical, electrical or magnetic fields to modify the chemical specificity between the object and the scanning probe tip apex. An input interface in accordance with the invention such as pointing device 100 allows a user to more intuitively perform complex operations such as those mentioned above than is possible using prior art keyboard and conventional computer mouse inputs.

Figure 4B:
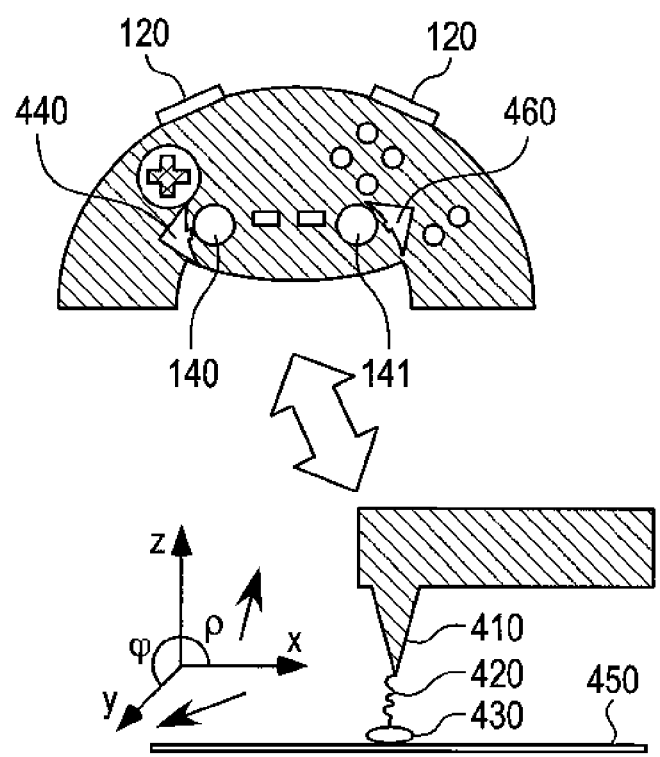
FIG. 4b shows a scanning probe microscope application.

FIG. 4b shows a generic example of the use of pointing device 100 in the context of a classic pulling experiment. In nano-scale pulling experiments, SPM scanning probe tip 410 is used to measure the mechanical properties of flexible linker molecule 420 which may be a DNA strand. One end of flexible linker molecule 420 is attached to solid support 430 which may be a polymer bead several hundreds of nanometers in diameter and the other end of flexible linker molecule 420 is attached to SPM scanning probe tip 410. The user typically controls the force between scanning probe tip 410 and linker molecule 420 by moving scanning probe tip 410 with respect to solid support 430, slowly stretching linker molecule 420 until linker molecule 420 is fully extended to allow the user to obtain information about the tertiary structure of linker molecule 420.

A concern with typical pulling experiments as described above is that it is typically difficult to input desired movement parameters into an SPM system while trying to also manipulate fragile objects such as, for example, flexible linker molecule 420 using a conventional interface. Pointing device 100 allows operation in several modes to enable a more intuitive input of the required movements. For example, with reference to FIG. 4b, thumb joystick 140 may be used to control movement in the x-y plane while thumb joystick 141 would control movement in the y-z plane as indicated by arrows 440 and 450, respectively, with the magnitude of the applied force in each direction controlled by the magnitude of the force applied to thumb joysticks 140 and 141. Pitch ($\phi$) and yaw ($\rho$) angles between the pulling direction and sample surface 450 may also be varied by the user in this configuration. Furthermore, all movements are tracked by the SPM controller or personal computer so the user only needs to be concerned about operating controller pad 130 or thumb joysticks 140 and 141 to manipulate linker molecule 420, in this example. At the conclusion of an experiment, the user can recall the sequence of applied experimental parameters offline, displaying the data, for example, in a graphical plot.

Modes of operation beyond pure motion control are also possible in accordance with the invention. For example, the magnitude of the pulling speed or force may be controlled in any direction by adjusting the amount of actuation applied to thumb joysticks 140 and 141. In pointing device 100, thumb joysticks 140 and 141 may also contain an integrated button, (not shown) that when depressed allows each thumb joystick 140, 141 to control an alternate axis of motion resulting in up to four-axes of motion per joystick 140, 141, and usefully redundant control of all axes between scanning probe tip 410 and sample surface 450. The user may customize the control axes in accordance with the experiment to be performed. In another exemplary embodiment, the user may operate the SPM in a constant pulling speed or force mode with the user controlling the speed using an available toggle control on pointing device 100 while relying on thumb joysticks 140 and 141 for direction control. Another exemplary embodiment allows operation in mixed mode, enabling constant speed or force in one plane of motion while allowing the user to control the speed or force in the other plane. While the above exemplary embodiments have been discussed with respect to pulling-type applications, the exemplary embodiments discussed above are applicable to many nano-manipulation applications.

The use of pointing device 100 to operate an SPM can be used to enhance the user's insight of the nano-scale features of sample surface 450 by bidirectionally passing information from the SPM back to the user via tactile feedback. Traditional unidirectional input devices used with SPMs do not provide this capability. Some commercially available pointing devices have gyroscopic tilt sensors that allow the angle of the controller to be determine. The tilt sensors can provide tactile feedback to the user as tip 410 traces out the forces or topography of sample surface. The tilt sensors on pointing device 100 may be used in real time or during off-line analysis. Tilt sensors can be used as part of a position control mechanism to allow the user to navigate sample surface in real time which is useful for fast-scan operation of an SPM or to make off-line image analysis a more intuitive operation.

The vibration feature on some commercially available pointing devices can be useful for nano-manipulation applications using "fly by wire" control to obtain real-time tactile feedback as the forces or the position applied to scanning probe tip 410 with respect to sample surface 450 change. The user can use the vibration feedback on pointing device 100 to obtain a physical feel of the sample surface topography or friction as sample surface 450 is scanned with respect to scanning probe tip 410. Specifically, the user may use the vibration feedback feature to physically sense variation in the local force that results from the scanning probe tip 410 interacting with sample surface 450, such as friction, magnetic, electric or chemical variations. Vibration feedback can also be used to physically sense or feel variation of externally applied electrical, chemical or optical forces. An improved understanding of sample surface characteristics may be obtained using the vibration feature feedback mechanism, similar to a driver of a vehicle who uses force feedback from the steering wheel while driving. The level of vibration may be made to correspond to intrinsic or user-applied friction, current, capacitance or any other SPM measurement. For example, the vibration feature may be used, in accordance with the invention, to monitor wear of scanning probe tip 410 in real time or to alert the user of potential scanning probe tip damage by vibrating pointing device 100 if scanning probe tip-sample surface forces exceed acceptable limits. The vibration feedback can be combined with tilt sensor information to provide improve tactile feedback. For example, in accordance with the invention, tilt sensors can be used to provide a control signal for the magnitude of vibration, much like the force feedback that a driver naturally receives from a steering wheel while turning the car.

In accordance with the invention, a "fly by wire" interface can be applied subsequent to acquisition of an SPM image to use that SPM image to provide a "map" for controlling scanning probe tip 410 in a subsequent scan. In an embodiment, pointing device 100 is used to control SPM scanning probe tip 410 using a virtual movement over the previous scan of sample surface 450, analogous to the movement over terrain on flight simulators. The level of vibration communicated to the user by pointing device 100 may be proportional to the sample surface height or force as described above.

The invention claimed is:

1. A system for controlling a scanning probe microscope having a scanning probe tip operable to scan a sample surface in real time comprising:

a scanning probe microscope controller that controls the operation of said scanning probe microscope;

a central processing unit in bidirectional communication with said scanning probe microscope controller; and a pointing device in communication with said scanning probe microscope controller, said pointing device providing input to said system, said input enabling active control of said scanning probe microscope in real time, wherein said active control includes real time motion control of said scanning of said sample surface, wherein said pointing device provides tactile feedback.

2. The system of claim 1 wherein said central processing unit is part of a personal computer.

3. The system of claim 1 wherein said pointing device is in direct communication with said central processing unit.

4. The system of claim 3 wherein said direct communication is bidirectional.

5. The system of claim 1 wherein said pointing device is in direct communication with said scanning probe microscope controller.

6. The system of claim 5 wherein said direct communication is bidirectional.

7. The system of claim 1 wherein said central processing unit is integrated with said scanning probe microscope controller.

8. The system of claim 1 further comprising a keyboard in direct communication with said central processing unit.

9. The system of claim 8 wherein said communication is bidirectional.

10. The system of claim 8 wherein said pointing device is in direct bidirectional communication with said keyboard.

11. The system of claim 1 wherein said pointing device is selected from a group consisting of a game pad, a joystick, a computer mouse, an isometric joystick, a computer touch screen, a scroll wheel and a wearable pointing device.

12. The system of claim 1 wherein said pointing device comprises a vibration feedback capability.

13. The system of claim 12 wherein said vibration feedback capability is enabled to provide feedback on local forces resulting from the interaction of a scanning probe tip of said scanning probe microscope with a sample surface.

14. The system of claim 12 wherein a level of said vibration feedback capability corresponds to a scanning probe measurement.

15. The system of claim 1 wherein said pointing device comprises action controls that are color coded.

16. The system of claim 1 wherein said scanning probe microscope is a high speed scanning probe microscope.

17. The system of claim 1 wherein said pointing device is used to enable the application of a specific predetermined series of discrete voltage pulses to a sample surface by said surface scanning probe microscope in response to a single input to said pointing device by a user of said microscope.

18. The system of claim 1 wherein a first control of said pointing device is enabled to control movement in an x-y plane while a second control of said pointing device is enabled to control movement in a y-z plane.

19. The system of claim 1 wherein image data derived from a first surface scan generated by said scanning probe microscope are used to control said scanning probe tip of said scanning probe microscope in performance of a second surface scan.

* * * * *